(12) United States Patent
Arab-Sadeghabadi

(10) Patent No.: US 6,295,394 B1
(45) Date of Patent: Sep. 25, 2001

(54) SENSOR ARRAY HAVING A NON-FIBER OPTIC SENSOR AND A PASSIVE FIBER OPTIC CABLE

(75) Inventor: Akbar Arab-Sadeghabadi, Simi, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/364,945

(22) Filed: Jul. 30, 1999

(51) Int. Cl.$^7$ ........................................................ G02B 6/00
(52) U.S. Cl. ........................... 385/12; 385/3; 385/8; 385/40; 385/89; 385/94; 250/227.14; 73/1.85; 73/6.55
(58) Field of Search ...................... 385/12, 13, 89, 385/94, 101, 2, 3, 8, 9, 40, 134, 135; 250/227.11, 227.14, 227.15, 227.16; 73/1.82, 1.85, 653, 655, 656, 657

(56) References Cited

U.S. PATENT DOCUMENTS

| | | | |
|---|---|---|---|
| 5,042,895 | * | 8/1991 | Chouinard et al. ...................... 385/2 |
| 5,497,233 | * | 3/1996 | Meyer ................................... 356/345 |
| 5,898,517 | * | 4/1999 | Weis ..................................... 356/5.09 |

* cited by examiner

Primary Examiner—Rodney Bovernick
Assistant Examiner—Omar Rojas
(74) Attorney, Agent, or Firm—Price and Gess

(57) ABSTRACT

A sensor array includes a fiber optic cable and at least one electro-optical conversion unit connected to the cable. The electro-optical conversion unit includes a housing formed of mating upper and lower covers. The housing includes an interior cavity for receiving a phase modulator module, a strength member and an interferometer formed by fibers connected to various splices and couplers in combination with the phase modulator module. The interior of the housing is filled with a fill material for holding the position of optical fibers to thereby protect against environmental factors such as shock and moisture.

11 Claims, 3 Drawing Sheets

SENSOR ARRAY HAVING A NON-FIBER OPTIC SENSOR AND A PASSIVE FIBER OPTIC CABLE

BACKGROUND OF THE INVENTION

The invention relates to sensor arrays for sensing systems such as those used for seismic sensing.

BRIEF SUMMARY OF THE INVENTION

One aspect of the invention is a sensor array that includes a flexible fiber optic cable including a plurality of optical fibers extending along the longitudinal axis of the cable; at least one signal conversion unit located between the ends of the cable; the signal conversion unit including an electro-optical circuit for receiving an electrical signal and converting the electrical signal to an optical signal; and the optical circuit being coupled to at least one of the optical fibers.

Another aspect of the invention is an electro-optical conversion unit located within a fiber optic cable of the type including a plurality of optical fibers within a protective jacket surrounding a stress-bearing bearing member comprising a housing defining an internal cavity; an electrical first connector attached to the lower cover; a phase modulator module located within the internal cavity having an electrical input; an electrical conductor within the cavity for transmitting an electrical signal from the first connector to the modulator module; and an interferometer within the internal cavity optically connected with at least one of the fibers.

Yet another aspect of the invention is a sensor array comprising a fiber optic cable that includes a plurality of optical fibers and a stress-bearing member within a protective jacket, the stress-bearing member being removed from an internal segment of the cable to form opposing ends of the stress-bearing member; at least one signal conversion unit being inserted between the opposing ends of the stress bearing member; the signal conversion unit including a housing having an internal cavity for receiving the optical fibers within the internal cavity; a strength member having opposed ends located within the cavity, the ends being fixed to the opposing ends of the stress-bearing member; an electrical connector fixed to the housing for receiving an electrical signal, an electro-optical circuit comprising an interferometer having an optical output signal responsive to an electrical input signal, the electro-optical circuit located within the casing; an electrical conductor for transmitting an electrical signal from the connector to the electro-optical circuit; and the electro-optical circuit being optically coupled to provide an optical input and output to at least one of the fibers;

DETAILED DESCRIPTION OF THE INVENTION

Figure 1:
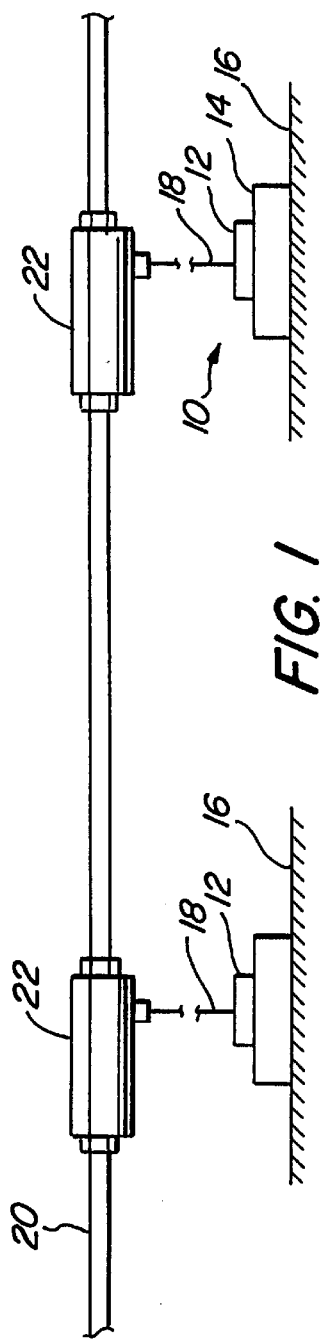
FIG. 1 illustrates the sensor array in accordance with the invention.

FIG. 1 illustrates the sensor array in accordance with the invention used for gathering data from a plurality of vibration sensors 10. Each sensor 10 comprises a geophone 12 that senses mechanical vibrations of a platform 14 upon which the geophone is mounted. The vibrations are typically seismic waves that propagate through the earth 16. Sensors 10 are electromechanical devices that provide an electrical output signal in response to sensed vibration through an electrical conductor 18 to the sensor array of the invention. The sensor array of the invention receives such electrical signals and provides means to convert such signals to corresponding optical signals in the form of interference patterns that are transmitted through a fiber optic cable 20 for detection by a remotely located photo detector (not shown). Thus, the invention includes a sensor array, which includes a fiber optic cable with at least one electro-optical conversion unit 22.

Figure 2:
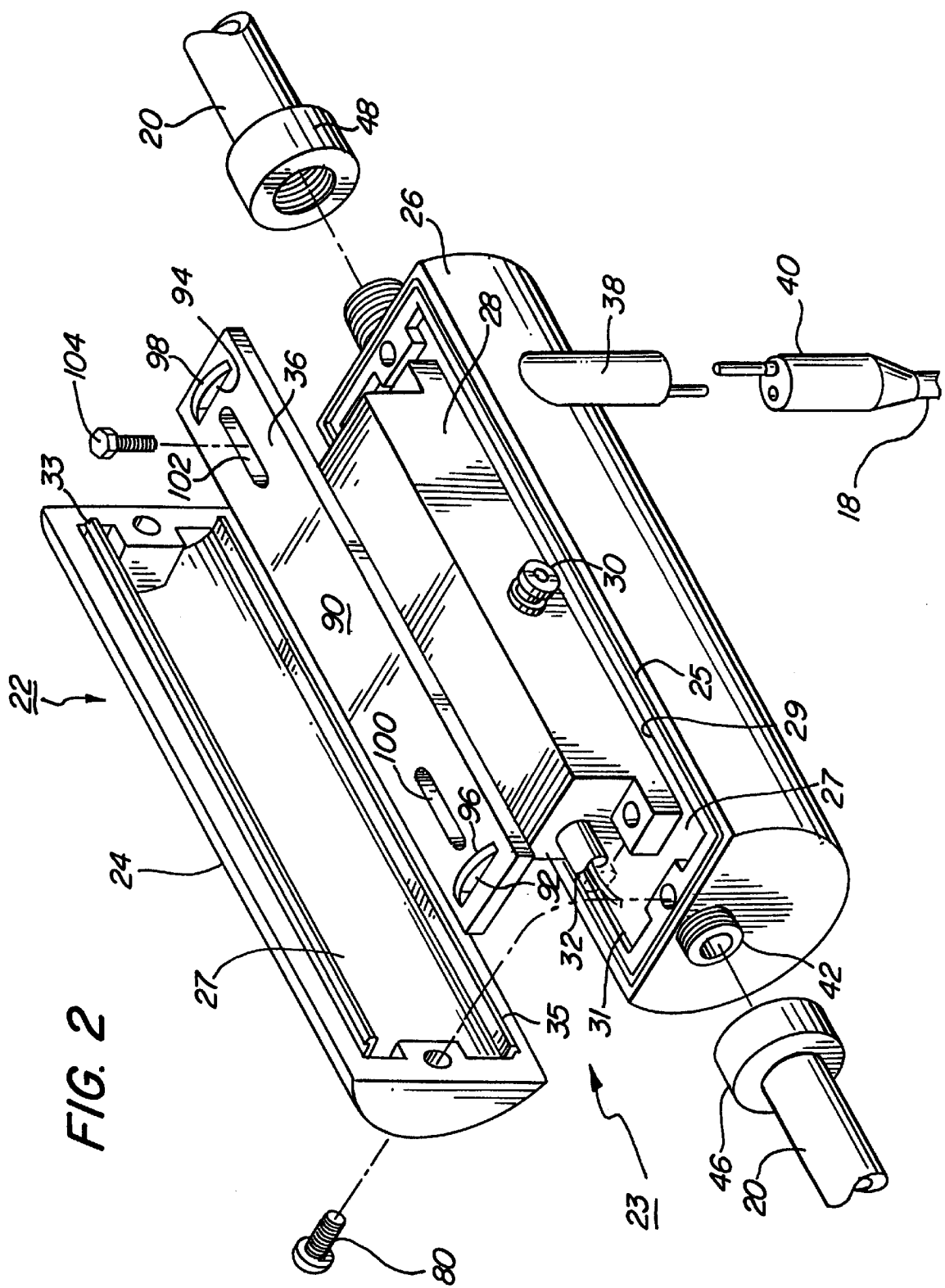
FIG. 2 is an exploded perspective view illustrating major elements of an electro optical conversion unit.

FIG. 2 illustrates of the electro-optical conversion unit 22 in accordance with the invention. The unit 22 includes a housing 23 formed by upper cover 24 mated to lower cover 26. The covers may are made preferably of an elastomeric material such as nylon or plastic. Ridges 29 and 31 which project inwardly from the lower cover 26 engage recesses in flanges 33 and 35 which extend inwardly from upper cover 24 to fasten together the covers along their mutually opposing longitudinal surfaces. Projections 33 and 35 are flexible to advantageously permit a"snap-on" and "snap-off" assembly and disassembly of the covers. Gasket 25 recessed within lower cover 26 provides a water resistant seal between the opposing peripheral surfaces of lower and upper covers 24 and 26. The interior of the covers 24 and 26 form an internal cavity 27 for receiving a phase modulator module 28 having a modulating electrical signal input port 30 and pigtailed optical input and output ports 32 and 34, respectively. The module 28 is commercially available from Uniphase Electro-Optics Products Division. The module 28 is an enclosed unit for creating a phase shift or delay in light propagating in an internal optical waveguide (not visible) of electro-optic material such as lithium niobate.

A strength member 36 is also located within the internal cavity 27. The strength member 36 is a stress-bearing element which, as will be shown, prevents the optical fibers of the cable 20 and the electro optical conversion unit 22 from being stressed by longitudinal forces placed upon the cable 20. A first connector 38 is formed in the lower cover 26. The first connector 38 may be a banana plug having both male and female coupling components. The first connector 38 mates to a second connector 40 which can be a banana plug, a conventional electrical connector for terminating an electrical conductor 18 that transmits an electrical signal output from the geophone 12. Threaded connectors 42 and 44 at opposed ends of the lower cover 26 receive internally threaded collets 46 and 48 that receive the ends of segments of the cable 20.

Figure 3:
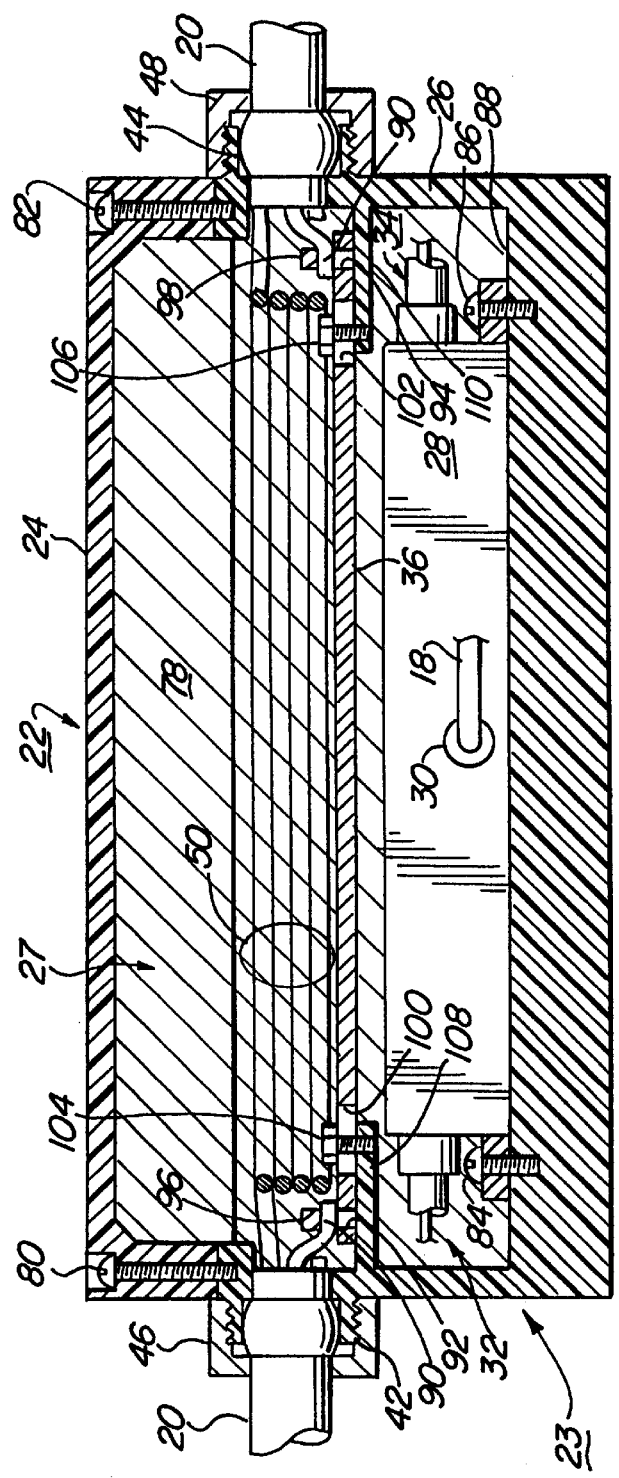
FIG. 3 is a cross sectional side view of an assembled electro-optical conversion unit.

FIG. 3 illustrates a cross-sectional side view of the assembled electro-optical conversion unit. Portions of a plurality 50 of the optical fibers leading out of the cable 20 are looped and are located within the internal cavity 27. Two fibers of the cable 20 (not entirely shown) are attached to the opposed pigtailed input port 32 and output port 34 through couplers by means of splices.

Figure 4:
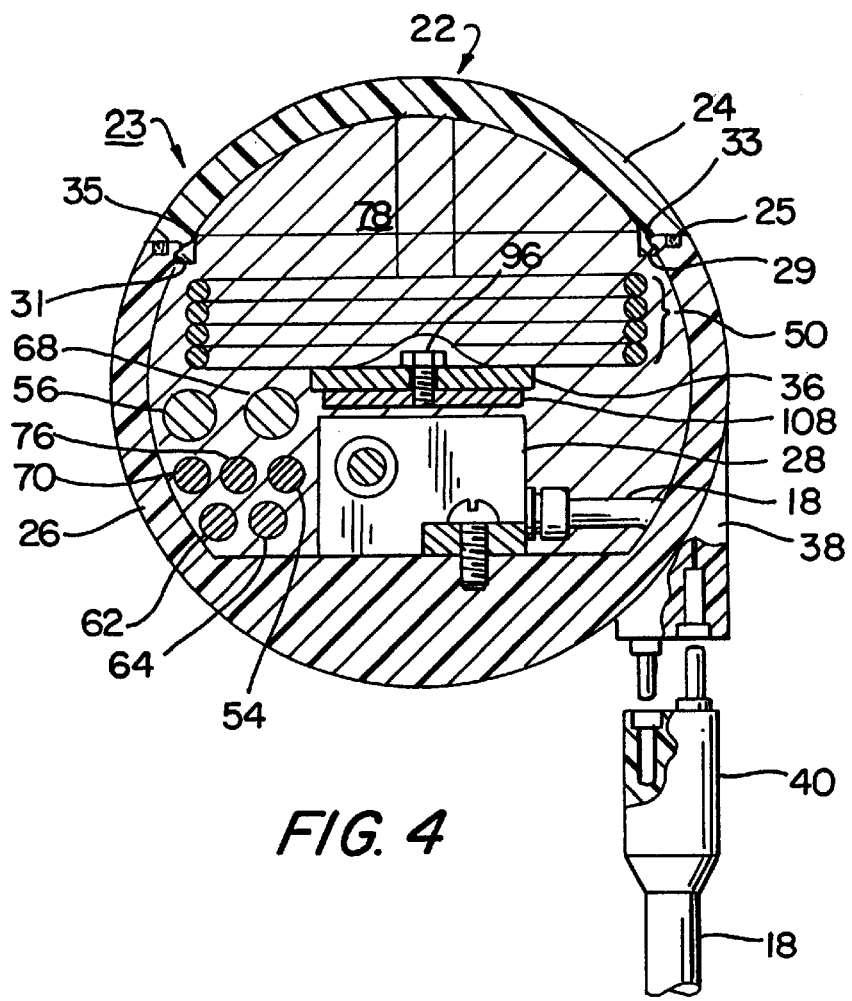
FIG. 4 is a cross sectional frontal view of an electro-optical conversion unit.
Figure 5:
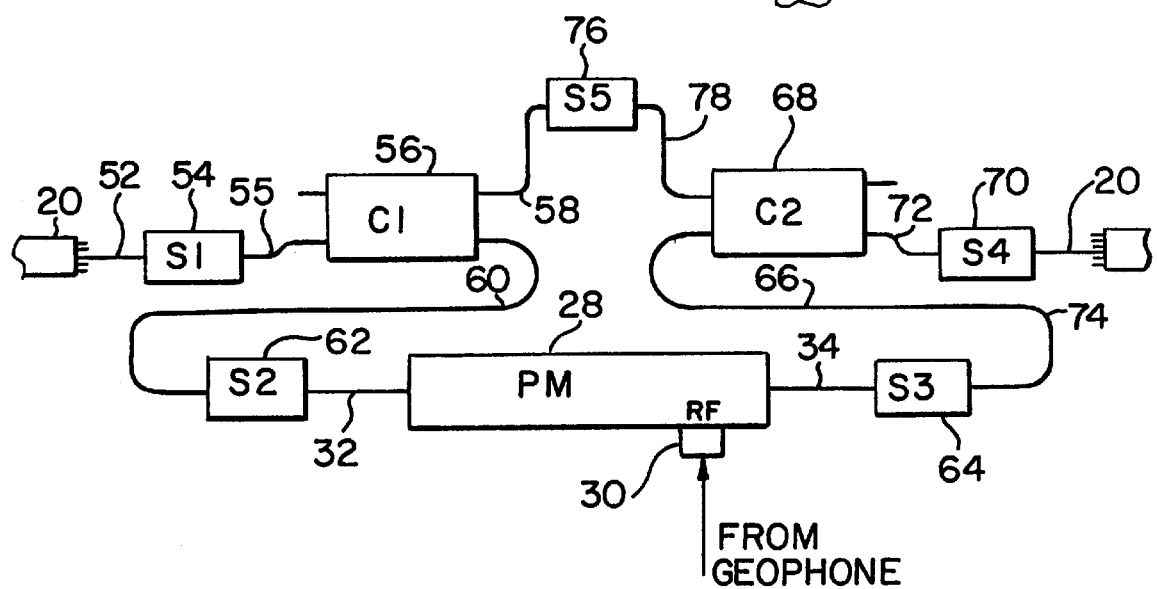
FIG. 5 is a schematic diagram of an interferometer incorporated within the electro-optical conversion unit.

Reference is now made to FIGS. 3, 4 and 5. As shown in FIG. 5, the optical circuit is an interferometer in which a first optical fiber 52 (different from the plurality of optical fibers 50) of the cable 20 enters the internal cavity 27 of the electro-optical conversion unit 22. Optical fiber 52 is joined by means of a splice 54 to a pigtail 55 of a coupler 56. The coupler 56 couples some of the incoming optical energy (preferably 50%) to each of output pigtails 58 and 60. The output pigtail 60 is joined by means of splice 62 to the input pigtail 32 of the phase modulator module 28. The output pigtail 34 of the module 28 is joined by means of a splice 64 to a pigtail 66 of a coupler 68. A pigtail 72 of the coupler 68 is joined by means of a splice 70 to a second optical fiber 74 (also different from the plurality of optical fibers 50) leading from the stripped end of cable 20. The pigtail 58 of the coupler 56 is joined by means of a splice 76 to a pigtail 78 of the coupler 68.

Referring to FIG. 5, the optical circuit described above forms an interferometer of the Mach-Zehnder type. The circuit could be altered in a known manner to provide an interferometer of the Michelson type (not shown). The reference leg comprises the pigtails 58, 78, and the optical splice 76, and the active leg comprises the pigtails 60, 32, 34, 66, the splices 62 and 64 and the optical waveguide within the phase modulator module 28. The electrical signal from the geophone 12 enters the phase modulator module 28 at the port 30 and is applied to electrodes (not visible) arranged on opposing sides of the waveguide internal to the module 28. The electrical signal applied to the electrodes gives rise to a phase delay or phase shift in the optical signal travelling through the active leg of the interferometer. The optical signals travelling through the referenced leg and from the phase modulator module 28 are combined at the coupler 68 to provide an interference or fringe pattern responsive to the applied voltage from the geophone 12. The optical energy then travels through the second fiber 74 into the optical cable 20. The second fiber 74 acts as a return to provide the output of the optical circuit to a remote photo detector where it is converted into an electrical signal for analysis. As can be seen in FIG. 5, a total of five optical splices and two optical couplers are required for forming the optical circuit. Each splice comprises a fused junction of fibers ends protected by a shrink wrap cover. Each coupler comprises two adjacent optically self-coupled fibers protected by a similar shrink-wrapped cover.

Referring to FIG. 4, the splices 54, 62, 64, 70 and 76, along with the couplers 56 and 68 are held within the internal cavity 27 of the electro-optical conversion unit 22 by means of a protective fill material 78 that fills the internal cavity 27 to securely hold and protect the optical fibers and associated optical elements. The fill material is preferably a gel or other compliant, protective material that can be readily removed for servicing the interior of the housing 23.

Referring to FIG. 2, upper cover 24 is fastened to lower cover 26 by means of screws 80 and 82 which are countersunk within the upper cover 24. The combination of the upper and lower covers 24 and 26 fastened by screws makes the electro-optical conversion unit 22 capable of assembly and disassembly which advantageously facilitates maintenance and repair. As shown in FIG. 3, screws 84 and 86 fasten phase modulator module 28 to the floor 88 of the electro-optical conversion unit 22. As mentioned above, the strength member 36 accepts the stress that would otherwise disadvantageously be placed upon the other interior parts of the electro-optical conversion unit 22.

The cable 20 includes a stress-bearing member 90, which bears the stresses placed along the length of the cable 20 instead of the delicate optical fibers. The stress-bearing member 90 may be cord or braid made of metal or a synthetic material such as Aramid fibers or Vectran. The ends of the cable 20 are stripped of an outer protective jacket in order to expose the fibers. As shown in FIG. 3, the stripped ends of the cable 20 pass through the threaded connectors 44 and 42 at opposed ends of the unit 22, and are securely held in water resistance contact by the internally threaded collets 46 and 48. The protective jacket is suitably made of a flexible, durable, and watertight material such as polyethylene, polyurethane, or nylon.

The stress bearing members 90 are fastened to the opposed ends of the strength member 36. The stress bearing member, depicted here as an elongated planar bar, can be of any other convenient shape. As shown in FIG. 2 and 3., slots 92 and 94 located near the ends of the strength member 36 hold stirrup clamps 96 and 98 that are crimped to secure the stripped ends of the stress-bearings 90. Sets screws 104 and 106 pass through slots 100 and 102 within the strength member 36 to hold the strength member 36 to mounting flanges 108 and 110 which project inwardly from the opposed ends of the unit 22. The slots 100 and 102 are elongated along the longitudinal axis of the strength member 36 in order to permit some amount of shifting of the strength member 36 in response to forces directed along the length of the cable.

The structures disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description defines the scope of the invention. All modifications to the embodiments described herein that come within the meaning and range of equivalence of the claims are embraced within the scope of the invention.

What is claimed is:

1. A sensor array comprising:
   a. a flexible fiber optic cable including a plurality of optical fibers extending along the longitudinal axis of said cable, said fiber optic cable including a stress-bearing member extending along said longitudinal axis; and
   b. at least one signal conversion unit located between the ends of said cable, said signal conversion unit having a strength member having opposed ends, said strength member being attached to said stress-bearing member at its opposed ends, and
   c. an electro-optical circuit for receiving an electrical signal and converting said electrical signal to an optical signal, said optical circuit being coupled to at least one of said optical fibers.

2. The sensor array cable of claim 1 wherein said signal conversion device further includes a housing having an internal cavity for receiving said optical circuit, said stress-bearing element, and said optical fibers.

3. The sensor array cable of claim 2 wherein further including:
   a. A first connector for receiving a mating electrical plug;
   b. an electrical conductor having opposed ends located within said housing;
   c. said first connector being fixed to said housing; and
   d. one end of said electrical conductor being engaged to said first connector and the other end being engaged to said electro-optical circuit.

4. The sensor array of claim 1 wherein said strength member comprises an elongated planar bar.

5. The sensor array of claim 2 wherein said housing comprises mating upper and lower covers.

6. The sensor array of claim 2 wherein said internal cavity is filled with a fill material.

7. The sensor array of claim 6 wherein said fill material is a gel.

8. The sensor array of claim 2 wherein said electro-optical circuit comprises an interferometer.

9. An electro-optical conversion unit located within a fiber optic cable of the type including a plurality of optical fibers within a protective jacket surrounding a stress-bearing bearing member comprising:
   a. a housing having a lower cover, said housing defining an internal cavity;
   b. an electrical first connector attached to said lower cover;
   c. a phase modulator module located within said internal cavity having an electrical input;
   d. an electrical conductor within said cavity for transmitting an electrical signal from said first connector to said modulator module; and
   e. an interferometer within said internal cavity optically connected with at least one of said fibers.

10. The sensor array of claim 9 wherein said housing comprises mating upper and lower covers.

11. A sensor array comprising:
   a. a fiber optic cable that includes a plurality of optical fibers and a stress-bearing member within a protective jacket, said stress-bearing member being removed from an internal segment of said cable to form opposing ends of said stress-bearing member;
   b. at least one signal conversion unit being inserted between said opposing ends of said stress bearing member;
   c. said signal conversion unit including a housing having an internal cavity for receiving said optical fibers within said internal cavity;
   d. a strength member having opposed ends located within said cavity, said ends being fixed to said opposing ends of said stress-bearing member;
   e. an electrical connector fixed to said housing for receiving an electrical signal,
   f. an electro-optical circuit comprising an interferometer having an optical output signal responsive to an electrical input signal, said electro-optical circuit located within said casing;
   g. an electrical conductor for transmitting an electrical signal from said connector to said electro-optical circuit; and
   h. said electro-optical circuit being optically coupled to provide an optical input and output to at least one of said fibers.

* * * * *